Aug. 22, 1950   R. C. GOERTZ   2,519,365
EDDY-CURRENT GENERATOR
Filed July 31, 1945
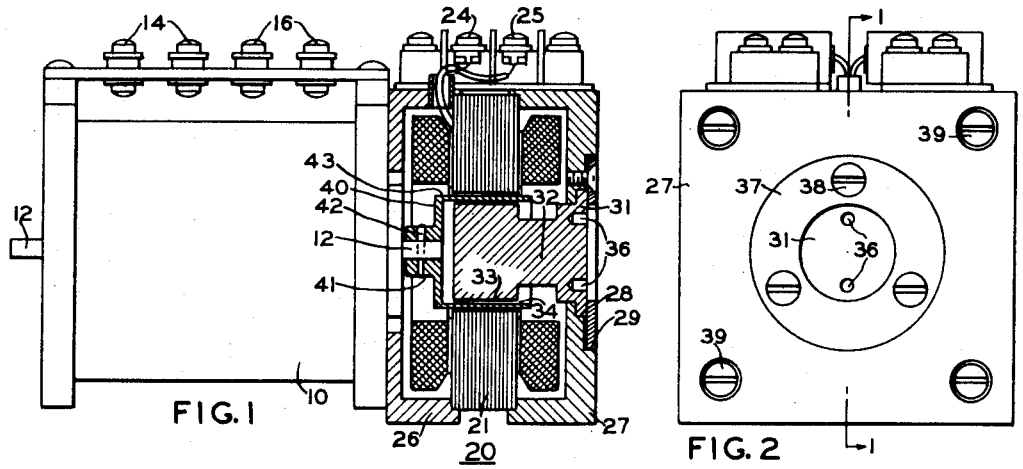
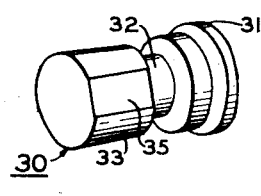
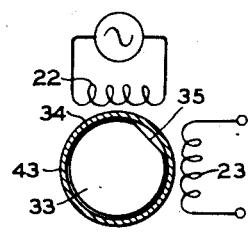
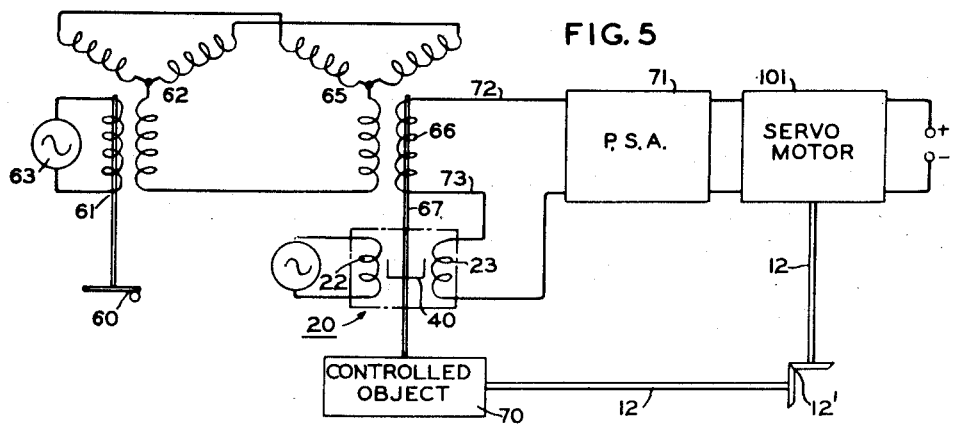
INVENTOR
RAYMOND C. GOERTZ
BY
Herbert P. Thompson
his ATTORNEY.

Patented Aug. 22, 1950

2,519,365

UNITED STATES PATENT OFFICE 2,519,365

EDDY-CURRENT GENERATOR

Raymond C. Goertz, Hempstead, N. Y., assignor to The Sperry Corporation, a corporation of Delaware Application July 31, 1945, Serial No. 608,051

17 Claims. (Cl. 171—252)

This invention relates to improvements in eddy-current generators or so-called dynamic transformers and, more particularly, to A. C. power-line frequency eddy-current generators having minimum residual and wobble voltages.

Eddy-current generators have been proposed for use in amplifier control circuits of servomotors and are usually coupled with such motor units in combination motor-generator structures where the motors serve directly for control purposes. The eddy-current generators are effective even in small size units. These small eddy-current generator units can be coupled with control motors of various sizes and can effect control, for example, of heavy duty servomotor-driven assemblies, such as gun platforms, radar equipment, etc., since the voltage outputs thereof are, in amplitude, substantially proportional to the speed at which they are driven.

The eddy-current generators, or rather dynamic transformers, have been found to have a serious latent defect in that, although the parts are made as symmetrical as possible for concentric, relatively rotatable disposition, they are subject to structural aberrations resulting in asymmetry of the component structural parts of the electrical and magnetic circuits. This is due, in part, to the mechanical difficulty of securing absolute concentricity of parts when reasonably tight mechanical dimensions are used, as well as the physical asymmetry of the stator elements including slots and associated windings, and, also, to the magnetic asymmetry in the magnetic components.

In the type of eddy-current generator described in Riggs' Patent 2,206,920, a magnetic circuit is formed of a stator, a core forming a magnetic gap with the stator, and a rotating, nonmagnetic cup mounted for rotation in the gap. The Riggs' device is not entirely satisfactory, due to asymmetry of the parts in the magnetic circuit. One difficulty arises from so-called residual voltage which is due to asymmetric coupling between the excited stator input coils and the output coils when the rotor is at rest. This undesired coupling effect is due, in part, to nonuniform spacing in the air gap.

With asymmetry in the magnetic circuit, as indicated, there is not only residual voltage when the rotor is at zero speed, but if the rotor is electrically asymmetric, a wobble voltage is also developed when the rotor is in motion. The wobble voltage is a function of the rotor position and has a frequency proportional to rotor speed. The modulation voltage developed by this characteristic can cause trouble in a servo system, making the operation of the latter rough and exciting resonant frequencies at certain speeds. With respect to residual voltage due to mutual asymmetry of stator and core, as indicated above, there will be coupling between the input and output phases at zero rotor speed, and this residual voltage may be large enough to cause saturation in a servo amplifier so that the amplifier becomes insensitive to any signal, and may bias the servo off zero. Such a voltage component is therefore undesirable.

It has been found that the effects produced in manufacturing result in asymmetry in the magnetic circuits of the eddy-current generators and also in magnetic asymmetry of the laminations of both stator and core due to grain resulting from positive or unidirectional orientation of the molecules or crystals in the metal sheet. These conditions can be corrected by forming an asymmetric core and orienting it in such a manner as to compensate for the manufacturing asymmetry, and thereby considerably reduce the residual voltage. It has been found further that such an asymmetric core can be made rotatable and adjusted in rotation to give a minimum output voltage value at zero rotor speed.

It is an object of the present invention, therefore, to provide improved magnetic circuits for eddy-current generators.

It is a further object of the invention to provide eddy-current generators having adjustable magnetic circuits which can be adjusted to compensate for inherent asymmetry in the generator elements.

Other features of novelty and advantage of the present invention reside in the manufacture and operation of improved eddy-current generators and the incorporation thereof in control systems of various kinds including remote control of guns, searchlights, radar equipment, direction finders, etc.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above and other desirable features of novelty and advantage of the present invention will be described in the specification and illustrated in the drawings, a certain preferred embodiment being shown incorporated in special structures and in servo motor control systems; this showing being by way of example only, for, since the novel generator structure may be incorporated in other units and control systems, it is not intended to be limited to the ones here shown, except as such limitations are clearly imposed by the appended claims.

In the drawings, like numerals refer to similar parts throughout the several views, of which Fig. 1 is an elevation view of a combined control motor-eddy-current generator, the generator being shown in vertical section taken on line 1—1 of Fig. 2;

Fig. 2 is a front view of the generator at the end of the motor-eddy-current generator unit of Fig. 1;

Fig. 3 is a perspective of a novel core member showing a chordate flat on the cylindrical surface;

Fig. 4 is a schematic of the circuit connections of the generator of Figs. 1 and 2 showing the asymmetric core member providing a differential air gap; and Fig. 5 is a circuit diagram of a remote control system utilizing Selsyn or Autosyn control and in which a servomotor-driven controlled object has a control circuit including a modified eddy-current generator.

The invention may be considered, therefore, as relating broadly to means for producing alternating current voltages of line frequency, for control purposes, as functions of rotational speeds, and, particularly, adapted for use in electrical control circuits for remote control of heavy objects. With the device herein, a smooth alternating current voltage, substantially free from modulation by residual voltage or wobble voltage, and depending upon rotational speed, can be produced. Due to the fact that the device, while a true generator, can be small, and has no frictional drag, it requires a negligible driving torque, so that it is practicable for use in cases where the taking of a high driving torque would give rise to inaccuracies in the control system. Because of this negligible driving torque, the device herein is essentially suited for use in data transmission systems.

Turning now to the drawings, there is shown, in Figs. 1 and 2, a motor generator unit comprising a servomotor 10 having an output shaft 12, one end of which is connected to the controlled object, or gearing driving the same, and the other end of which is connected to the rotor of the eddy-current generator 20, as will be described more in detail herein. The servomotor 10 may be provided with error signal input terminals 14 and field current terminals 16. The generator 20 comprises a laminated stator 21 having windings 22, 23 connected to terminals 24, 25. The stator is held between a pair of centrally apertured dished conductive frame members 26, 27 which, while they are in clamping engagement with the laminae of the stator, form no part of the magnetic circuit of the generator. The end frame 27, as noted, is centrally apertured and the periphery of the base or annulus defining the aperture is provided with a pair of stepped, offset rings or grooves 28, 29.

A preferably cylindrical core member 30 is fitted in the housing so as to be substantially concentric with the stator. The core comprises a flanged base 31 adapted for snug, rotating fit in flange 28 of frame 27, a center core section or post 32, and a laminated core section 33 formed on the post section. The laminated core section 33 is cylindrical and substantially equal in axial length to the laminar stator section 21 and is aligned therewith. Thus the stator laminations 21 and the core 30 will define a magnetic circuit having an annular air gap 34 therebetween.

The cylindrical core section 33 is provided on one side with a flat 35 which, preferably, defines a chord of the cylindrical core and parallels the longitudinal axis of the core. The base 31 of the core will be provided with a plurality of spanner holes 36. The core 30 is held in place in the frame 27 by means of a locking ring 37 secured to frame 27 by a plurality of machine screws 38 engaging registering tapped holes. The frame 27 will be held in place by screws 39 which may be lacquered or otherwise covered after assembly is complete. The core 30 can be rotated about its axis in groove 28 when ring 37 is loosened. This rotation of the core permits calibrating the instrument, and, when the proper angular or rotational position has been attained, the ring will be tightened in place and the screws coated with a suitable protecting lacquer or varnish.

The rotor of the generator comprises a cup-shaped member 40 having an arbor or shaft section 41 held on the motor shaft 12 by pin 42. The skirt or cup body 43 of the rotor should be, as accurately as possible, concentric with the aligned axes of the core 31, stator core 21 and, of course, that of motor shaft 12, so as to subdivide the air gap 34 into equal, concentric, cylindrical segments. However, as noted, the mechanical difficulties of forming the stator and core parts with true concentricity, particularly where the surfaces have to be ground to shape, generally results in some unavoidable asymmetry between the parts, and transformer coupling takes place between the energized input coil and the output coil when the rotor is at rest or at zero speed.

The flat 35 provides a differential in the inner section of the air gap, that is, the portion between the core section 33 and the rotor skirt or body 43. By rotating the core 30, it will be seen that when the flat 35 is juxtaposed to a section of the rotor and/or stator whose magnetic asymmetry is sufficiently marked, it will tend to provide a balance in the magnetic circuit. Thus, if generator 20 has any surface of laminar section 21 outsize, the juxtaposition of the flat 35 of the core to such section will correct the error. Therefore, in a state of rest, with the input coil energized, the residual voltage of the generator will be reduced to a minimum, because the balance point of the magnetic circuit has been found by rotating or orienting the core about the core axis to obtain the desired result. Where variation in residual voltage characteristic is encountered, the core may be removed and trimmed, as by filing the flat, or replaced by other like cores having differentially placed and fixed flat areas.

This provision of a balanced magnetic circuit including an air gap defined by surfaces which are not practically susceptible of assuming or being given true concentricity, is essentially the crux of the present invention. It permits the adjustment and control of the magnetic circuits to a fineness and closeness which was not possible hitherto. Additionally, it permits the utilization of asymmetric control members, which must be closely calibrated, yet which are formed by essentially production line methods. Thus the eddy-current generators may be made up in quantity, the parts rough finished, and the final calibration and adjustment made after the instruments are permanently installed in the desired control systems.

The calibration of the generators to secure a minimum residual voltage at zero rotor speed, will be relatively simple, and will require merely the rotation of core 30 in place to secure the desired zero speed-null voltage characteristic, which can be instantly tested. The base or outer surface of the section 31 of the core may be appropriately aligned and indexed with respect to the clamping ring 37, so that a given generator may be utilized in different circuits, or in one definite circuit, and may be calibrated for varying currents or conditions of operation, and entailing differential electrical characteristics between different parts of the magnetic circuit.

The generator is shown in Fig. 5 coupled in a control circuit. Such a circuit may comprise a control member 60 controlling the rotor 61 of a Selsyn or "Autosyn-like" transmitter 62. The rotor can be energized by suitable alternating current from source 63. The stator 65 of the receiver Selsyn or signal transformer is inductively coupled to rotor 66, which is mounted on a shaft 67, connected to the controlled object 70 which is required to be in strict angular agreement with the position of control member 60. The controlled object 70 may comprise a gun, radar equipment, searchlights and other objects which must be positioned and operated in exact agreement with their controls.

In Fig. 5, it will be seen that the error signal received by the rotor coil 66 will be transmitted to the phase sensitive amplifier 71 through lines 72, 73. The line 73 may be desirably connected to the output coil 23 of the eddy-current generator 20. The drive from the servomotor to the controlled object will be through shafting 12 which is shown coupled by gearing 12'. The members or shafts 67 and 12 may be identical in actual practice, or they may be separate members connected through gearing, or in other suitable manner.

In operation, it will be seen that the error signal supplied from rotor coil 66 of the signal transformer to the input of amplifier 71 will function as the primary control signal in controlling the servomotor 101. The speed voltage or secondary signal developed in generator 20 is connected in such phase sense as to buck the error signal in the input to the amplifier. Thus the incorporation of the eddy-current generator 20 in the control circuit, and the calibration of its functioning parts to give the optimum electrical characteristics for the particular system, permits a fineness of control which has not been possible hitherto, even with custom-made apparatus designed and built for a given installation. The generator units may be incorporated in any system, and the residual voltage characteristics modified or controlled by controlling the type and extent of the surface of area 35 on the core 30, and its orientation with respect to the stator, thereby controlling the size and disposition of the corrected air gap in relation to the exciting and pick-up or generator windings.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an eddy-current generator characterized by the inherent magnetic asymmetry of its structure, an outer stator having a cylindrical bore therein, an inner stationary magnetic core of predesigned, appreciably asymmetrical cross section disposed within said bore and spaced from said stator to define an air gap therebetween, a conductive nonmagnetic cup mounted to rotate in said air gap, the asymmetry of said core being such that said inherent magnetic asymmetry is effectively offset thereby.

2. In an eddy-current generator characterized by the inherent magnetic asymmetry of its structure, an outer stator, an inner stationary magnetic core spaced therefrom and defining an air gap therebetween, a conductive nonmagnetic cup mounted to rotate in said air gap, said core being formed with a flattened surface on one side thereof.

3. In an eddy-current generator characterized by the inherent magnetic asymmetry of its structure, an outer stator having a cylindrical bore therein, an inner stationary magnetic core of predesigned, appreciably asymmetrical cross section disposed within said bore and spaced from said stator to define an air gap therebetween, a conductive nonmagnetic cup mounted to rotate in said air gap, the stator, core and rotor elements having reasonably tight mechanical dimensions, and means for adjusting the core in rotation.

4. In an eddy-current generator characterized by the inherent magnetic asymmetry of its structure, an outer stator, an inner stationary magnetic core spaced therefrom and defining an air gap therebetween, a conductive nonmagnetic cup mounted to rotate in said air gap, the inherent magnetic asymmetry resulting in residual voltage at zero speed of the rotor, and compensating means for the inherent magnetic asymmetry comprising a flat on the core, and means for adjusting the core in rotation.

5. In an eddy-current generator characterized by the inherent magnetic asymmetry of its structure, an outer stator, an inner stationary magnetic core spaced therefrom and defining an air gap therebetween, a conductive nonmagnetic cup mounted to rotate in said air gap, the stator, core and rotor elements having reasonably tight mechanical dimensions and having imperfect mechanical concentricity, the generator developing residual voltage at zero speed of the rotor, means for reducing the inherent residual voltage characteristic comprising a chordate flat on the core, and separate means for adjusting the core in rotation.

6. In an eddy-current generator characterized by the inherent magnetic asymmetry of its structure, an outer stator, an inner stationary magnetic core spaced therefrom and defining an air gap therebetween, a conductive nonmagnetic cup mounted to rotate in said air gap, the stator, core and rotor elements having reasonably tight mechanical dimensions and having imperfect mechanical concentricity, the generator developing residual voltage at zero speed of the rotor, means for reducing the inherent residual voltage characteristic comprising a chordate flat on the core, and separate means for adjusting the core in rotation to vary the angular position of the flat with respect to the stator.

7. In an eddy-current generator characterized by the inherent magnetic asymmetry of its structure, an outer stator, an inner stationary magnetic core spaced therefrom and defining an air gap therebetween, a conductive nonmagnetic cup mounted to rotate in said air gap, the generator having residual voltage at zero speed of the rotor due to transformer coupling of the excited phase flux to the second phase coils of the stator as a result of said magnetic asymmetry, compensating means for the magnetic asymmetry comprising a flattened surface on one side of the core, and an orientable mounting for the core whereby it is adjustable in rotation.

8. An eddy-current generator comprising a stator having a cylindrical bore therein, a stationary magnetic core of predesigned, appreciably asymmetrical cross section disposed within said bore and spaced from said stator to define a variable air gap therebetween, a conductive nonmagnetic cup mounted to rotate in said air gap, input and output windings on the stator and wound in quadrature, and means for adjusting the core in rotation.

9. An eddy-current generator comprising a stator having a cylindrical bore therein, a stationary magnetic core of predesigned, appreciably asymmetrical cross section disposed within said bore and spaced from said stator to define a variable air gap therebetween, a conductive nonmagnetic cup mounted to rotate in said air gap, input and output windings on the stator and wound in quadrature, means for varying the angular position of the asymmetric core with respect to the stator and means for locking said core in adjusted position.

10. An eddy-current generator comprising a stator having a cylindrical bore therein, a magnetic core of predesigned, appreciably asymmetrical cross section disposed within said bore and spaced from said stator to define a variable air gap therebetween, a conductive nonmagnetic cup mounted to rotate in said air gap, and input and output windings on the stator and wound in quadrature.

11. An eddy-current generator comprising a stator having a cylindrical bore therein, a magnetic core of predesigned, appreciably asymmetrical cross section disposed within said bore and spaced from said stator to define a variable air gap therebetween, a conductive nonmagnetic cup mounted to rotate in said air gap, input and output windings on the stator and wound in quadrature, and means for adjusting the core in rotation, the stator and core having aligned laminated magnetic structures substantially coextensive in the direction of the axis of rotation of the cup.

12. An eddy-current generator comprising a stator, a magnetically asymmetric stationary magnetic core spaced therefrom and defining a variable air gap therewith, a conductive nonmagnetic cup mounted to rotate in said air gap, input and output windings on the stator and wound in quadrature, and means for adjusting the core in rotation, the stator and core having coplanar laminated magnetic structures of uniform depth, the laminated section of the core having a flat on one side.

13. An eddy-current generator comprising a stator having a cylindrical bore therein, a magnetic core of predesigned, appreciably asymmetrical cross section disposed within said bore and spaced from said stator to define a variable air gap therebetween, a conductive nonmagnetic cup mounted to rotate in said air gap, input and output windings on the stator and wound in quadrature, the stator and core having aligned laminated magnetic structures substantially coextensive in the direction of the axis of rotation of the cup.

14. An eddy-current generator comprising a stator, an angularly orientable and magnetically asymmetric stationary magnetic core spaced therefrom and defining a variable air gap therewith, a conductive nonmagnetic cup mounted to rotate in said air gap, input and output windings on the stator and wound in quadrature, the stator and core having coplanar laminated magnetic structures of uniform depth, the laminated section of the core having a flat on one side.

15. The method of compensating for residual voltage at zero rotor speed in eddy-current generators having inherent magnetic asymmetry, comprising imparting a known asymmetry to the core by forming a flattened surface at the side thereof, and rotating the core in place to orient the flattened surface in a position such that minimum residual voltage is developed in the generator.

16. The method of compensating for residual voltage at zero rotor speed in eddy-current generators having inherent magnetic asymmetry, comprising imparting a known asymmetry to the core by forming a flattened surface at the side thereof, and rotating the core in place to vary the angular position of said flattened surface with respect to the cooperating elements of the magnetic circuit of the generator and thereby locate and determine the core position of minimum asymmetry.

17. The method of compensating for residual voltage at zero rotor speed in eddy-current generators having inherent magnetic asymmetry, comprising imparting a known asymmetry to the core by forming a flattened surface at the side thereof, and rotating the core in place to vary the orientation of said flattened surface with respect to the cooperating elements of the magnetic circuit of the generator and thereby locate and determine the core position of minimum asymmetry.

RAYMOND C. GOERTZ.

REFERENCES CITED

The following references are of record in the file of this patent:

UNITED STATES PATENTS

| Number | Name | Date |
|---|---|---|
| 1,809,197 | Fendrich | June 9, 1931 |
| 2,206,920 | Riggs | July 9, 1940 |